(12) United States Patent
Turunen

(10) Patent No.: US 9,288,305 B2
(45) Date of Patent: Mar. 15, 2016

(54) METHOD AND APPARATUS FOR MONITORING A CHARACTERISTIC OF AN OBJECT IN MECHANICAL CONTACT WITH A MOBILE TERMINAL

(75) Inventor: Seppo Tapio Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 693 days.

(21) Appl. No.: 13/577,645

(22) PCT Filed: Feb. 9, 2010

(86) PCT No.: PCT/IB2010/050581
§ 371 (c)(1),
(2), (4) Date: Aug. 7, 2012

(87) PCT Pub. No.: WO2011/098862
PCT Pub. Date: Aug. 18, 2011

(65) Prior Publication Data
US 2012/0323522 A1    Dec. 20, 2012

(51) Int. Cl.
*H04M 1/725* (2006.01)
*H04M 19/04* (2006.01)

(52) U.S. Cl.
CPC ...... *H04M 1/72569* (2013.01); *H04M 1/72522* (2013.01); *H04M 19/047* (2013.01); *H04M 2250/12* (2013.01)

(58) Field of Classification Search
CPC .............. H04M 1/72569; H04M 2250/12; H04M 19/047; H04M 1/72522
See application file for complete search history.

(56) References Cited

U.S. PATENT DOCUMENTS

| 5,436,622 | A | 7/1995 | Gutman et al. |
| 5,647,579 | A * | 7/1997 | Satoh ....................... 267/140.14 |
| 6,377,900 | B1 * | 4/2002 | Ueno et al. .................... 702/109 |
| 6,897,598 | B2 * | 5/2005 | Kato et al. ............... 310/323.02 |
| 7,023,326 | B2 | 4/2006 | Hwang |
| 7,430,439 | B2 | 9/2008 | Griffin et al. |
| 2005/0215295 | A1 | 9/2005 | Arneson et al. |
| 2006/0222568 | A1 | 10/2006 | Wang et al. |
| 2007/0000305 | A1 | 1/2007 | Ma et al. |
| 2008/0132196 | A1 * | 6/2008 | Soh et al. .................... 455/404.1 |
| 2008/0216578 | A1 | 9/2008 | Takashima et al. |

(Continued)

FOREIGN PATENT DOCUMENTS

| CN | 1516505 A | 7/2004 |
| CN | 1934849 A | 3/2007 |

(Continued)

OTHER PUBLICATIONS

Brisben et al., "Detection of Vibration Transmitted Through an Object Grasped in the Hand" J Neurophysiol 81:1548-1558, 1999.*

(Continued)

*Primary Examiner* — Alexander Satanovsky
*Assistant Examiner* — John Kuan
(74) *Attorney, Agent, or Firm* — Harrington & Smith

(57) ABSTRACT

An apparatus comprising at least one processor and at least one memory including computer program code the at least one memory and the computer program code configured to, with the at least one processor, cause the apparatus at least to perform, actuating within an apparatus a motion in at least one actuation direction, monitoring the motion in the apparatus in at least one monitoring direction, and determining from the monitoring an characteristic of an object in contact with the apparatus.

17 Claims, 6 Drawing Sheets

(56) References Cited

U.S. PATENT DOCUMENTS

| | | | |
|---|---|---|---|
| 2009/0147973 A1* | 6/2009 | Gitzinger et al. | 381/190 |
| 2010/0001874 A1 | 1/2010 | Cipra | |
| 2010/0004028 A1* | 1/2010 | Park et al. | 455/566 |
| 2010/0056208 A1* | 3/2010 | Ashida et al. | 455/556.1 |

FOREIGN PATENT DOCUMENTS

| | | |
|---|---|---|
| CN | 101334691 | 12/2008 |
| EP | 1415286 A1 | 5/2004 |
| EP | 1063837 B1 | 10/2005 |
| EP | 1600907 B1 | 4/2007 |
| GB | 2327320 A | 1/1999 |
| GB | 2347593 A | 9/2000 |
| JP | 2002-243708 A | 8/2002 |
| WO | 03/005314 A1 | 1/2003 |
| WO | 2005/104520 A1 | 11/2005 |
| WO | 2008/075082 A1 | 6/2008 |
| WO | 2009/038862 A1 | 3/2009 |

OTHER PUBLICATIONS

International Search Report and Written Opinion received for corresponding International Patent Application No. PCT/IB2010/050581, dated Oct. 15, 2010, 16 pages.

Office action received for corresponding Chinese Patent Application No. 201080063524.5, dated Oct. 14, 2014, 9 pages of office action and 3 pages of office action translation Available.

Office Action received for corresponding Chinese Application No. 201080063524.5, dated Mar. 3, 2014, 15 pages.

* cited by examiner

METHOD AND APPARATUS FOR MONITORING A CHARACTERISTIC OF AN OBJECT IN MECHANICAL CONTACT WITH A MOBILE TERMINAL

RELATED APPLICATION

This application was originally filed as PCT Application No. PCT/IB2010/050581 filed Feb. 9, 2010.

The present invention relates to feedback apparatus. The invention further relates to, but is not limited to, feedback apparatus in portable devices.

Current wireless mobile communication devices and portable computers are complex arrangements of microprocessors, memory, soundcards and display user interfaces. Such wireless devices are generally configured to communicate with each other over wireless networks maintained by the wireless carriers. A problem associated with such devices is that they typically are poor at determining the nature of their physical surroundings.

In particular such devices cannot determine their optimal mode of operation easily. For example such devices have typically to receive a physical input to switch into a hands operated/hands free mode dependent on whether is the device being held by a user, lying on a tabletop, or being pressed against an ear. Whilst, for example, some wireless devices rely on proximity sensing by using light reflection where a photo cell is required to determine whether or not the device is in shadow and determine whether the device is being held close to the ear and to use a hands held mode. However such detection is error prone as similar results can be produced by placing the device face down against a surface.

Furthermore detection of the physical surroundings is also problematic in such devices in order to prevent the device from carrying out an action which could result in damage. For example, a handset lying on a tabletop may vibrate itself off the table surface. Also the device by not detecting its surrounding may choose to operate in an unsuitable mode, for example, when the device vibrates on the table surface. The table surface may resonate producing an unpleasant sound effect.

In further examples the physical surroundings may be able to be used as inputs to the device. For example how firmly a device is held may indicate whether the user wishes to take a call.

Although there has been some research into detecting the physical surroundings using accelerometers to sense the motion of the device when excited by a vibration motor, these are typically limited in their sensitivity as the vibrators typically only produces vibrations in a primary plane (2 dimensional) or just in a single dimension which limits the sensitivity of the received environmental signal. Furthermore such devices have required complex designs requiring components such as micro electrical mechanical system (MEMS) accelerometers which require micro machined devices to be employed.

This invention thus proceeds from the consideration that by using actuators in a specific configuration or using actuators to detect acceleration differences, it may be possible to produce improved environmental awareness by an apparatus.

Embodiments of the present invention aim to address the above problem.

There is provided according to a first aspect of the invention a method comprising: actuating within an apparatus a motion in at least one actuation direction; monitoring the motion in the apparatus in at least one monitoring direction; and determining from the monitoring an characteristic of an object in contact with the apparatus.

Actuating within an apparatus a motion in at least one actuation direction may comprise actuating a motion in three substantially mutually orthogonal directions.

The method may further comprise providing an electromagnetic actuator configured for actuating within an apparatus a motion in at least one actuation direction and monitoring the motion in the apparatus in at least one monitoring direction.

One of the at least one actuation direction is possibly different to at least one monitoring direction.

Actuating within an apparatus a motion in at least one actuation direction may comprise: generating an actuation signal; and generating a motion in the at least one actuation direction dependent on the actuation signal.

The actuation signal may comprise at least one of: a sinusoidal signal for generating a substantially sinusoidal motion of a predetermined frequency; a pulse signal for generating a substantially pulsing motion; a burst signal; and a wideband signal for generating multi-resonant motion.

Determining the characteristic of the object located in contact with the apparatus may comprise: determining the difference between the motion in the apparatus in at least one monitoring direction against an expected motion; and determining the characteristic of the object dependent on the difference between the motion and expected motion.

The characteristic of the object may comprise at least one of: a location of the object relative to the apparatus; an elasticity of the object; a flexibility of the object; a compressibility of the object; a damping of the object; an inertia of the object; a mass of the object; a density of the object; a resonance frequency distribution of the object; and a retaining force exerted by the object on the apparatus.

The method may further comprise controlling the apparatus dependent on the characteristic of object located in contact with the apparatus.

Controlling the apparatus may comprise controlling an event notification application.

According to a second aspect of the invention there is provided an apparatus comprising at least one processor and at least one memory including computer program code the at least one memory and the computer program code configured to, with the at least one processor, cause the apparatus at least to perform: actuating within an apparatus a motion in at least one actuation direction; monitoring the motion in the apparatus in at least one monitoring direction; and determining from the monitoring an characteristic of an object in contact with the apparatus.

The apparatus caused to at least perform actuating within an apparatus a motion in at least one actuation direction is preferably further caused to perform actuating a motion in three substantially mutually orthogonal directions.

The apparatus may be further caused to perform providing an electromagnetic actuator configured for actuating within an apparatus a motion in at least one actuation direction and monitoring the motion in the apparatus in at least one monitoring direction.

One of the at least one actuation direction may be different to at least one monitoring direction.

The apparatus caused to at least perform actuating within an apparatus a motion in at least one actuation direction may be further caused to perform: generating an actuation signal; and generating a motion in the at least one actuation direction dependent on the actuation signal.

The actuation signal may comprise at least one of: a sinusoidal signal for generating a substantially sinusoidal motion of a predetermined frequency; a pulse signal for generating a substantially pulsing motion; a burst signal; and a wideband signal for generating multi-resonant motion.

The apparatus caused to at least perform determining the characteristic of object located in contact with the apparatus may be further caused to perform: determining the difference between the motion in the apparatus in at least one monitoring direction against an expected motion; and determining the characteristic of the object dependent on the difference between the motion and expected motion.

The characteristic of the object may comprise at least one of: a location of the object relative to the apparatus; an elasticity of the object; a flexibility of the object; a compressibility of the object; a damping of the object; an inertia of the object; a mass of the object; a density of the object; a resonance frequency distribution of the object; and a retaining force exerted by the object on the apparatus.

The apparatus may be further caused to perform controlling the apparatus dependent on the characteristic of object located in contact with the apparatus.

Controlling the apparatus may comprise controlling an event notification application.

According to third aspect of the invention there is provided an apparatus comprising: an actuator sensor configured to generate a motion of the apparatus in at least one actuation direction and to monitor apparatus motion in at least one monitoring direction; and a signal processor configured to determine dependent on the motion sensor output an characteristic of an object in contact with the apparatus.

The actuator sensor may be configured to generate a motion in three substantially mutually orthogonal directions.

The actuator sensor may comprise an actuator configured to generate the motion in at least one actuation direction and a motion sensor configured to monitor the motion in the apparatus in at least one monitoring direction.

The actuator may comprise at least one of: an eccentric rotating mass motor; a vibration motor; a linear resonant actuator; and a piezo-electric actuator.

The motion sensor may comprise at least one of: a linear resonant actuator configured to generate an electrical signal dependent on the motion of the apparatus; and a piezo-electric actuator configured to generate an electrical signal dependent on the motion of the apparatus.

The actuator sensor may comprise at least two actuator sensor components wherein each component is configured such that the least one actuation direction is different to at least one monitoring direction.

The signal processor may be configured to generate an actuation signal; wherein the actuator sensor is configured to generate a motion in the at least one actuation direction dependent on the actuation signal.

The actuation signal may comprise at least one of: a sinusoidal signal for generating a substantially sinusoidal motion of a predetermined frequency; a pulse signal for generating a substantially pulsing motion; a burst signal; and a wideband signal for generating multi-resonant motion.

The signal processor may comprise: a comparator configured to determine the difference between the motion in the apparatus in at least one monitoring direction against an expected motion; and an object determiner configured to determine the characteristic of the object dependent on the difference between the motion and expected motion.

The characteristic of the object may comprise at least one of: a location of the object relative to the apparatus; an elasticity of the object; a flexibility of the object; a compressibility of the object; a damping of the object; an inertia of the object; a mass of the object; a density of the object; a resonance frequency distribution of the object; and a retaining force exerted by the object on the apparatus.

The apparatus may further comprise a controller configured to control the apparatus dependent on the characteristic of object located in contact with the apparatus.

The controller may be configured to control an event notification application.

According to a fourth aspect of the invention there is provided an apparatus comprising: actuator sensor means configured to generate a motion of the apparatus in at least one actuation direction and to monitor apparatus motion in at least one monitoring direction; and signal processing means configured to determine dependent on the motion sensor output an characteristic of an object in contact with the apparatus.

According to a fifth aspect of the invention there is provided a computer-readable medium encoded with instructions that, when executed by a computer perform:

actuating within an apparatus a motion in at least one actuation direction; monitoring the motion in the apparatus in at least one monitoring direction; and determining from the monitoring an characteristic of an object in contact with the apparatus.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

DETAILED DESCRIPTION OF SOME EMBODIMENTS

The following describes apparatus and methods for generating context feedback in the form of physical surrounding detection in electronic devices or apparatus. In this regard reference is made to FIG. 1 which shows a schematic diagram of an exemplary electronic device or apparatus 10 which may incorporate context and physical surroundings feedback generating and detecting components according to embodiments of the application.

The apparatus may for example be a mobile terminal or user equipment for a wireless communication system. In other embodiments the electronic device or apparatus may be an audio player (also known as MP3 players), a media player (also known as MP4 players), or an electronic book reader. In some other embodiments the apparatus may be any suitable electronic device such as a personal data assistant (PDA), personal computer (such as a net book, tablet, or other mobile personal computer), or an electronic wallet with suitable actuator and sensor configurations.

Figure 1:
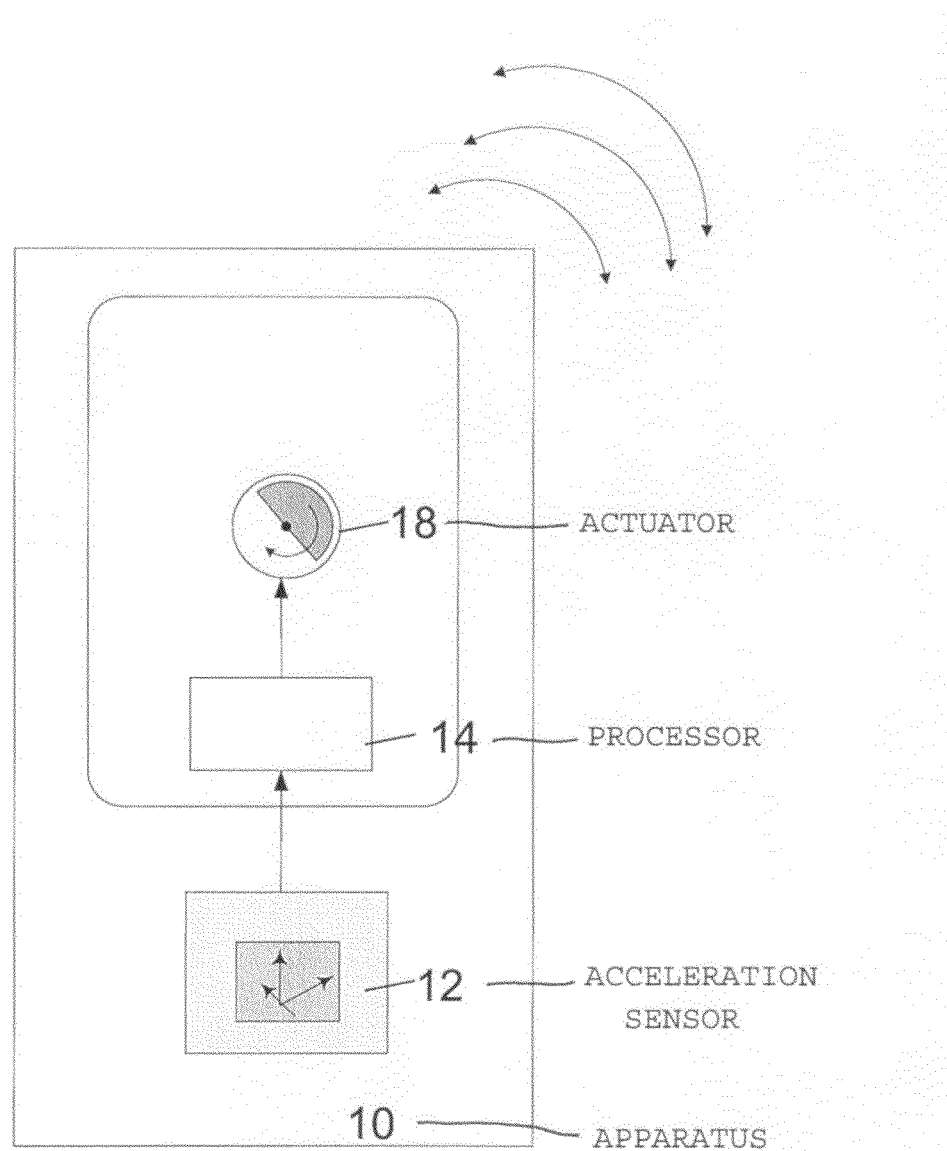
FIG. 1 shows schematically an electronic device employing embodiments of the application.

With respect to FIG. 1, an example of an apparatus suitable for implementing embodiments of the application is shown. It would be understood that the apparatus may comprise further components other than those described hereafter in order that the apparatus may function as a fully featured user equipment, or audio player or otherwise. However in order to simplify the explanation with regards to embodiments of the application, these will not be described further.

The apparatus 10 comprises an actuator 18, a processor 14 and an acceleration sensor 12. The apparatus 10 may in some embodiments further comprise a memory to which the processor 14 is connected. The processor may be configured to execute various program codes. The implemented program codes may in some embodiments control the operation of the actuator 18 and also control and monitor the acceleration sensor 12. The implemented program codes may be stored for example in the memory for retrieval by the processor whenever needed. The memory in some embodiments may further provide a section for storing data processed by the processor 14.

The processor 14 is connected to both the actuator 18 and the acceleration sensor 12. The acceleration sensor 12 shown in FIG. 1 may comprise a piezoelectric, piezoresistive, micromechanical capacitive or micro-electrical mechanical systems (MEMS) technology sensor. For example a MEMS accelerometer may be mounted on a circuit board within the apparatus 10. MEMS accelerometers may be based on bulk micro-machined, surface micro-machined and thermal micro-machined technology. For example in some embodiments a thermal based MEMS accelerometer has no moving parts where its principle of operation is based on differential thermal sensing of a heated gas within a haematic component. With no moving parts, such an accelerometer is capable of surviving the high shots typically experienced by apparatus both in field and during production.

Typically a single MEMS accelerometer may measure accelerations along two orthogonal axes. Thus two MEMS accelerometers positioned orthogonally to each other may provide complete three axis motion information. While accelerometers output acceleration measurements and not position measurements, if position measurements are required then these can be calculated by double integration of the acceleration measurements.

The actuator 18 typically comprises a motor driver which may be an eccentric mass actuator motor as shown in FIG. 1 or a pancake/coin motor or any suitable vibration actuator such as a piezoelectric vibration generation device suitable for generating a motion of the apparatus in response to the motion of the actuator 18. For example the rotation of the eccentric mass actuator causes an unbalanced moment of rotation to be generated. This unbalanced moment of rotation causes a motion of the device in a single plane. Thus in some embodiments by locating a further eccentric mass accelerometer orthogonally to the first plane of motion a full three dimension vibration may be created. It would be understood that the motion of the apparatus is dependent not only on the motion of the actuator but also on the support of the apparatus. For example when the apparatus 10 is in "free air" the apparatus would be free to move in all three dimensions with no resistance. This "free air" vibration is shown with respect to FIG. 1.

Figure 2:
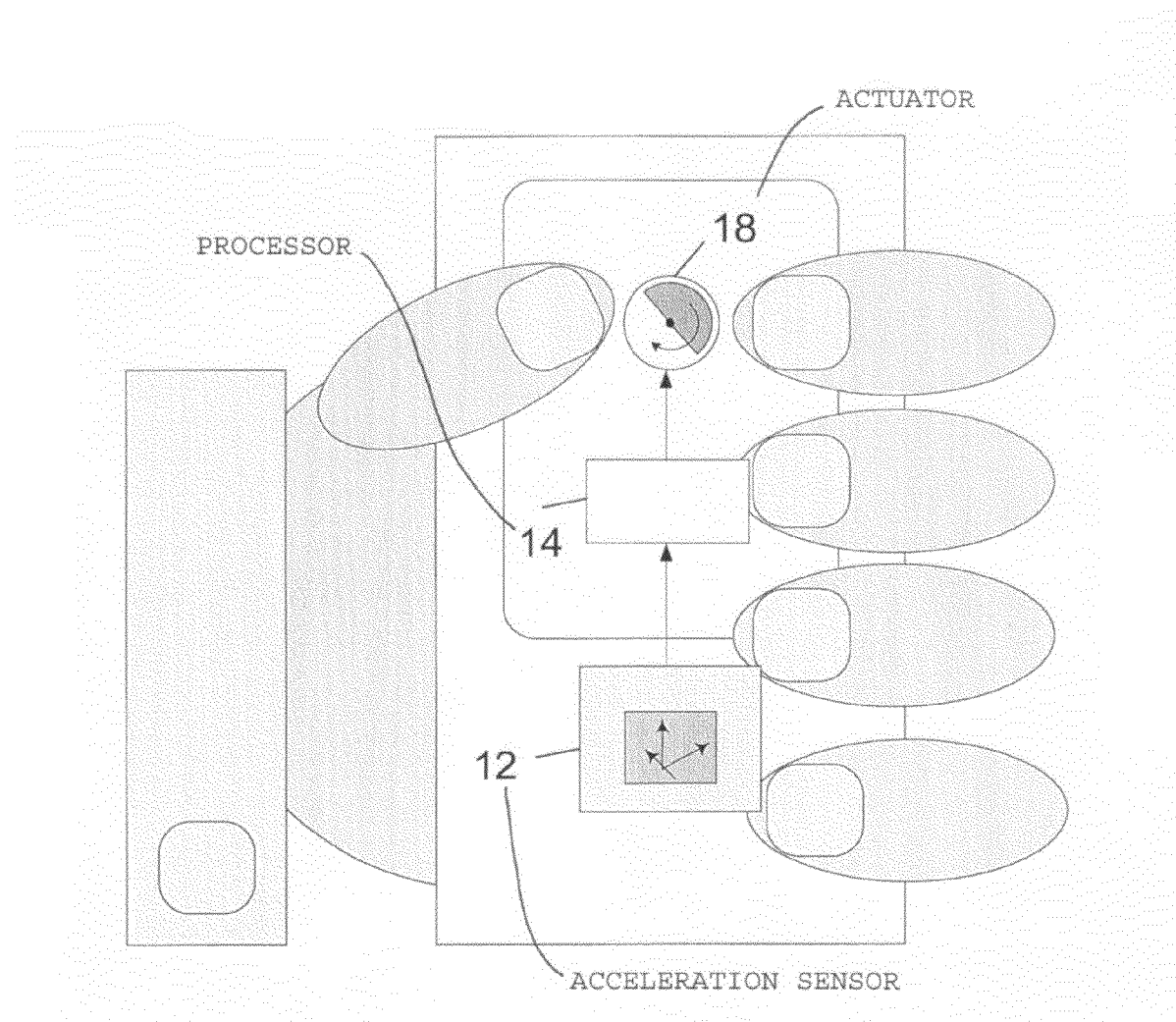
FIG. 2 shows schematically an electronic device as shown in FIG. 1 when held.

With respect to FIG. 2 the apparatus is shown being held firmly in hand.

Thus when the apparatus is held there is resistance on the motion of the apparatus. In other words the apparatus motion is damped depending on how and how firmly the apparatus is held. For example an apparatus held in the hand lightly against the ear will experience a different dampening force to the apparatus held firmly in the hand, for example within the user's fist. This is shown in FIG. 2 by the lack of a "motion blur" in the figure indicating that when held firmly the apparatus motion is firmly damped.

Figure 3:
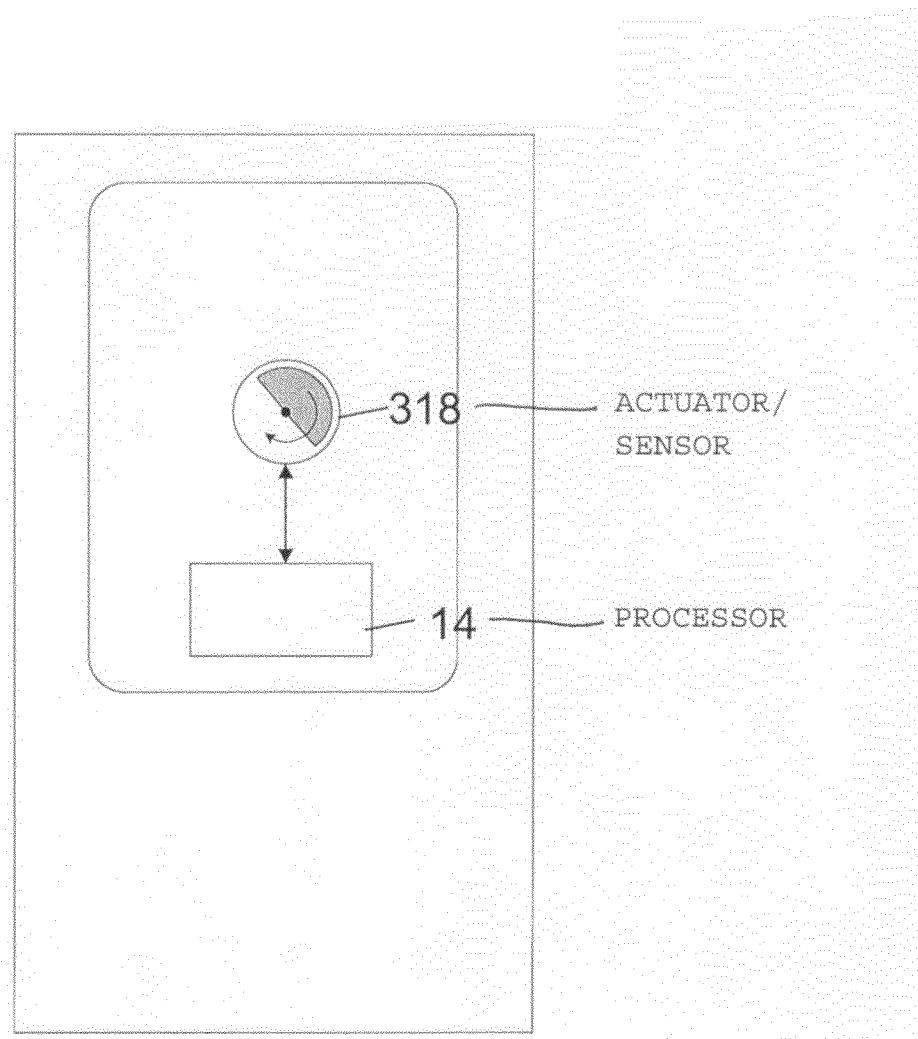
FIG. 3 shows schematically an electronic device employing some further embodiments of the application.

With respect to FIG. 3 a schematic view of some further embodiments is shown wherein the apparatus 10 comprises only an actuator/sensor 318 connected to a processor 14. In such embodiments the actuator is configured not only to move in response to a signal provided from the processor but is also configured to detect or sense the motion of the apparatus in response to the motion.

Figure 4:
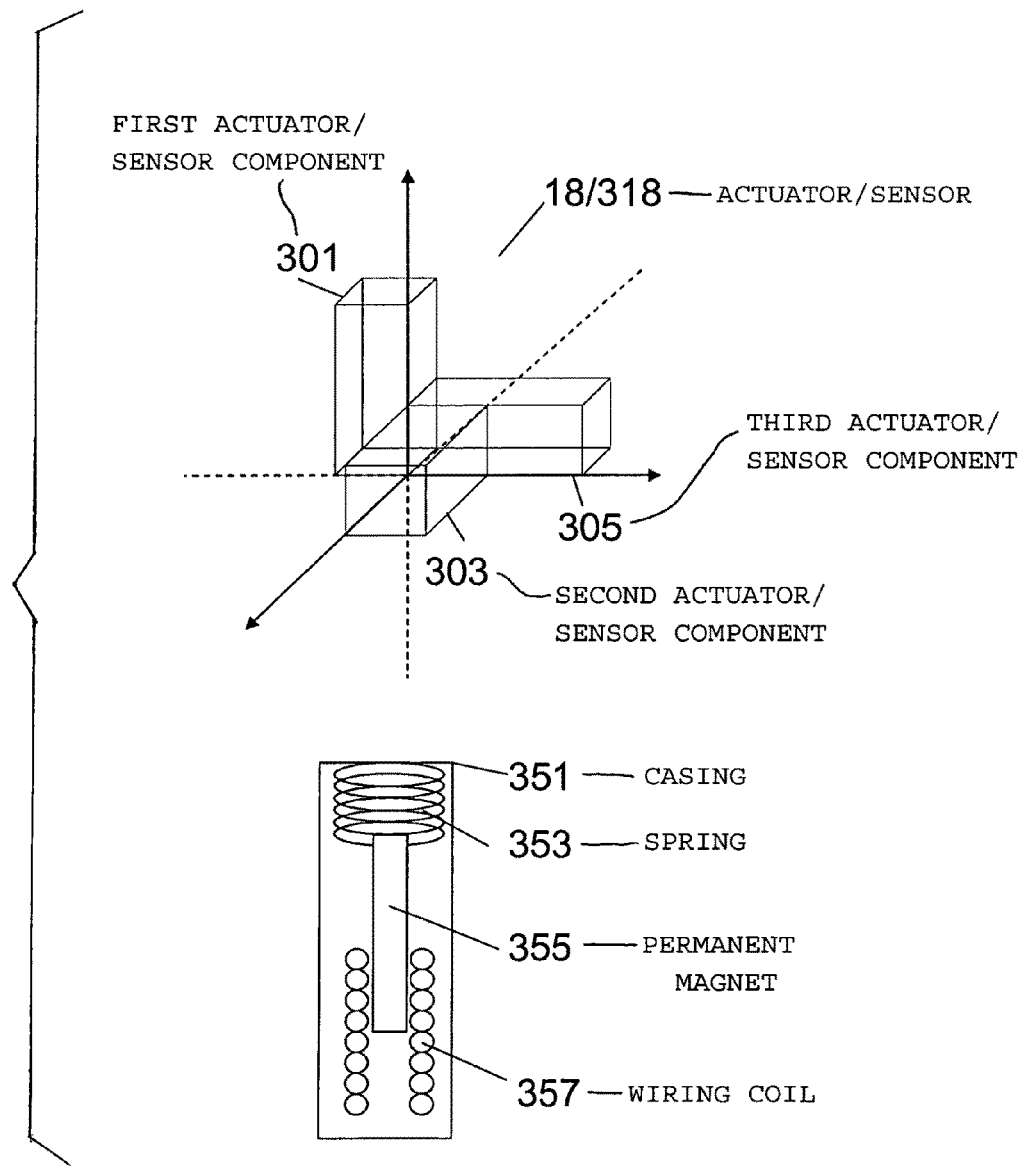
FIG. 4 shows schematically the actuator shown in FIGS. 1 to 3 in further detail according to some further embodiments.

With respect to FIG. 4, an example of actuator/sensor 318 configuration is shown in further detail. The actuator/sensor 318 comprises three vibration/sensor elements located orthogonally from each other. Thus as shown in FIG. 4 there comprises a first actuator/sensor component 301, a second actuator/sensor component 303 orthogonally positioned relative to the first actuator/sensor 301 and a third actuator/sensor component 305 located orthogonally to both the first actuator/sensor component 301 and the second actuator/sensor component 303.

Furthermore with respect to FIG. 4, an example of an actuator/sensor component is shown in further detail. The actuator/sensor component comprises a casing 351 to which is attached a spring 353. The spring 353 is further connected to a permanent magnet 355 which is configured to move according to a primary dimension or direction. The actuator/sensor component furthermore comprises a wiring coil 357. The wiring coil 357 is configured to pass an electric current and generate an electric field which interferes with the permanent magnet 355 magnetic field and produces an electromotive force (EMF) which pushes the permanent magnet mass along the primary direction.

Furthermore as described any motion of the magnet causes a motion of the apparatus in response. Any damping of the response motion of the apparatus furthermore causes a reaction in the motion of the permanent magnet 355 within the coil 357 and produces via a back EMF "a secondary current" in the coil dependent on the motion of the magnet. Therefore as described above the vibration or motion of the magnet is dependent on the case 351 and the apparatus 10 reaction and damping, the back EMF and current generated thereof reflects the damping caused by any physical components surrounding in that primary direction.

Although the actuator/sensor component is shown using a permanent magnet and solenoid/coil is would be appreciated that any suitable electromagnetic actuator may be used. Thus, for example in some embodiments the sensor/actuator may be a loudspeaker actuator, a pancake/coin motor or any suitable electromagnetic actuator. Furthermore although a three dimensional actuator/sensor configuration is shown, it would be understood that a 2 dimensional (using a single 2 dimensional actuator/sensor or two orthogonal positioned one dimension actuator/sensor) or 1 dimension (using a single 1 dimension actuator/sensor) configuration may be employed in some other embodiments. Similarly, the actuator in an actuator configuration may be according to embodiments be a single dimension actuation, a two dimension actuation or a three dimension actuation.

Figure 5:
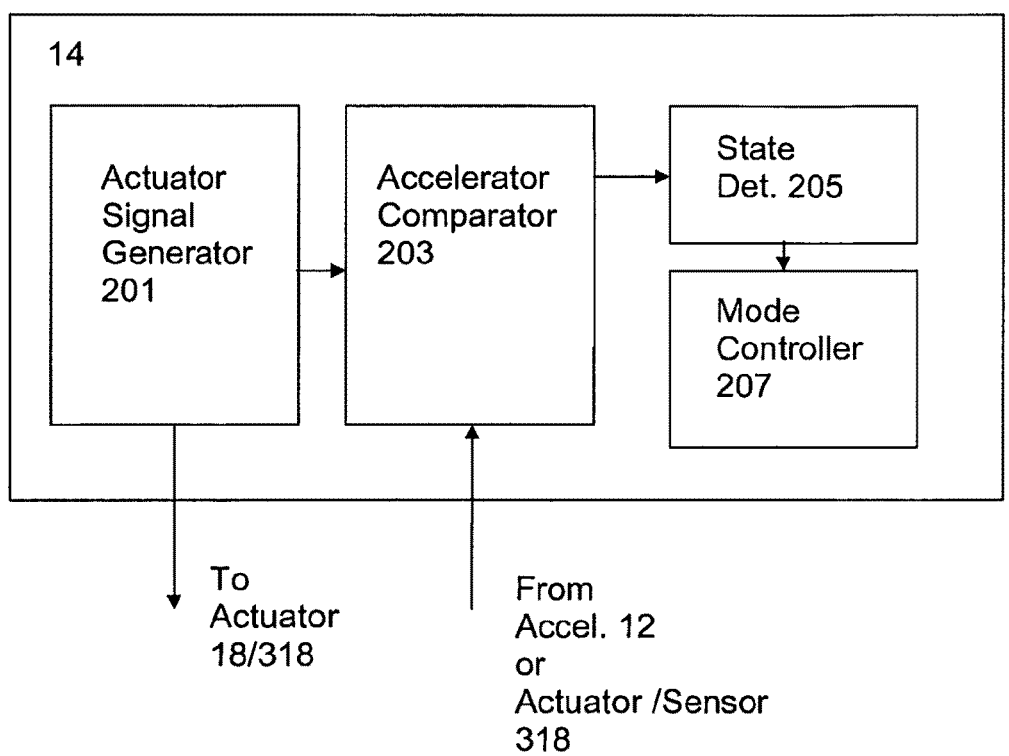
FIG. 5 shows schematically the processor shown in FIGS. 1 to 3 in further detail according to some further embodiments.

With respect to FIG. 5, an example of the processor 14 is shown in further detail with respect to some embodiments of the application. The processor 14 in some embodiments comprises an actuator signal generator 201 which is configured to output an actuator signal to drive the actuator and also output the same signal to the accelerator comparator 203.

The processor 14 in some embodiments further comprises an accelerator comparator 203 configured to further receive a signal from the accelerometer 12 or actuator/sensor 318. The accelerator comparator 203 in some embodiments then compares the two signals and outputs a difference to be categorized. The accelerator comparator thus in some embodiments is configured to output a comparison signal to a state detector 205.

The processor 14 in some embodiments comprises a state detector 205 which is configured to determine from the received difference or comparison signal the physical state of the apparatus 10. In other words the state detector determines the damping experience by the apparatus and thus how the device is physically suspended. The detector state 205 furthermore outputs a state variable to the mode controller 207.

Figure 6:
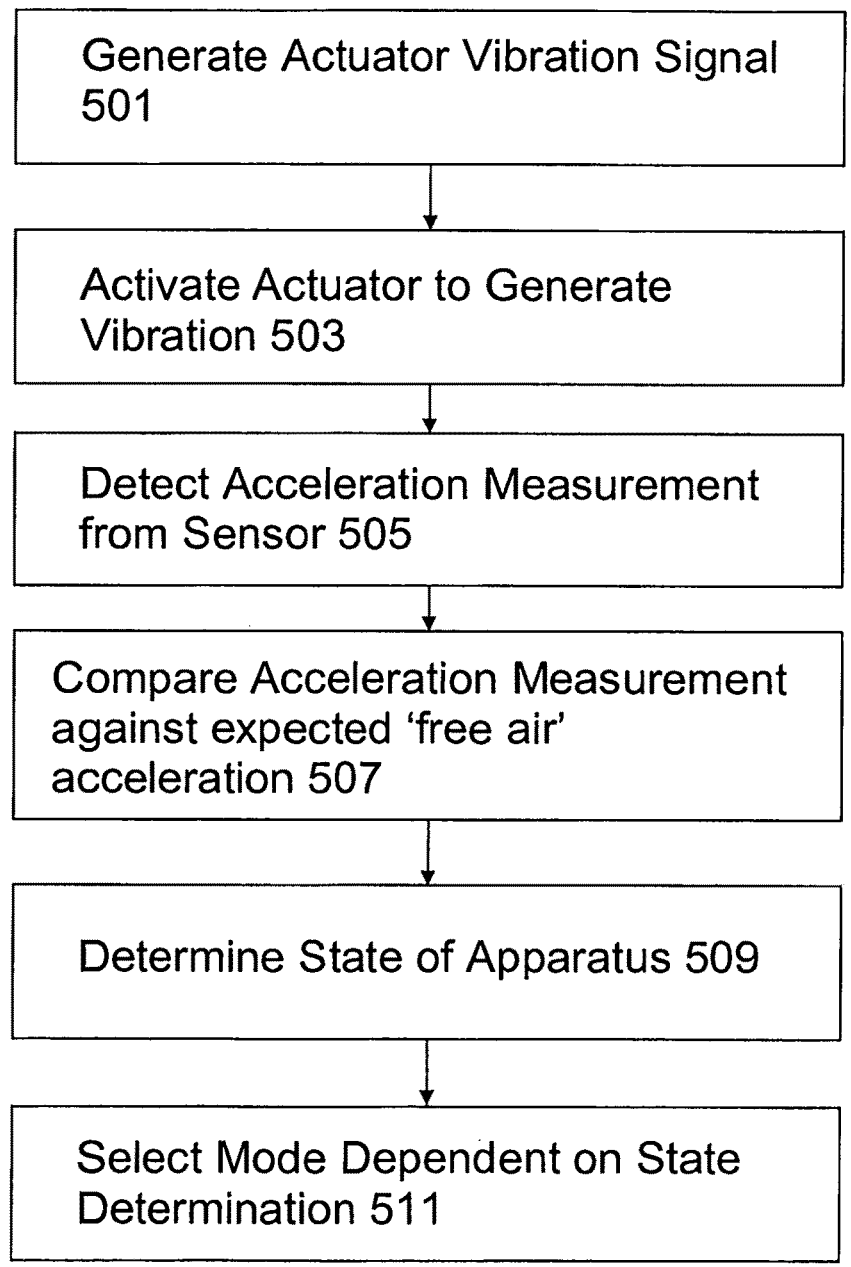
FIG. 6 shows schematically a flow chart showing the operation of some embodiments of the application.

With respect to FIG. 6 an example of the operation of the actuator/sensor 318 arrangement and processor 14 is described in further detail, with respect to some embodiments of the application.

The actuator signal generator 201 as described above can generate an actuator signal and pass the actuator signal to the actuator 18. The operation of generating the actuator vibration to signal is shown in FIG. 6 by step 501.

In some embodiments the actuator vibration signal can be a sinusoidal signal, in other words a single "tone" or frequency. However in some embodiments the actuator vibration signal may be a wideband signal in other words a "multi-tonal" signal suitable for detecting different resonant feedback for a range of frequencies. In some embodiments the actuator vibration signal is a pulse signal which for generating a substantially pulsing motion which similarly comprises a wide band of frequencies which may cause a range of detectable resonance modes. In some other embodiments the actuator vibration signal is a burst signal. In some embodiments one or more different forms of types of signals can be used as the actuator vibration signal so to attempt to locate a resonant mode.

The actuator may then generate a vibration dependent on the actuator vibration signal 501. For example in some embodiments the same signal is passed to all three orthogonal components at the same time. In other embodiments the actuator components are activated according to a predetermined order in order to detect the damping effect in each direction individually.

The generation of the vibration by the actuator is shown in FIG. 6 by step 503.

The acceleration measurement may then be determined based on the detection from either the accelerometer 12 or the actuator sensor component 18. This can be then passed to the accelerator comparator 203.

The operation of detecting the acceleration is shown in FIG. 6 by step 505.

The accelerator comparator 203 may then determine the difference between the detected acceleration measurement from the accelerometer or actuator and the original signal or compare it against an expected "free" air signal which would be closely correlated to the actuator signal generator signal 201 if no damping was present. The comparison of the acceleration measurement against the expected acceleration could then be passed to the state detector 205.

The operation of comparison is shown in FIG. 6 by step 507.

The accelerator comparator passes the comparison value or difference value to the state detector 205. The state detector 205 in these embodiments on receiving the comparison values can then determine within which directions the apparatus is being held or prevented from moving. Furthermore the difference values may determine how the apparatus is being held and how firmly the apparatus is held. Other characteristics of the objects in contact with the apparatus which may be determined in some embodiments of the application may be a location of the object relative to the apparatus; an elasticity of the object; a flexibility of the object; a compressibility of the object; a damping of the object; an inertia of the object; a mass of the object; a density of the object; a resonance frequency distribution of the object; and a retaining force exerted by the object on the apparatus. The state detector may use any suitable approach to determine the state of the apparatus dependent on the difference/comparison. For example the state detector may comprise a look-up table which is pre-programmed with known states which are "taught" to the state detector and can be recalled upon determining similar difference/comparison signals. In some other embodiments any suitable pattern recognition application may be used to recognise similar states of the device. This state detection 205 values may then be passed to a mode controller 207.

The determination of the state of the apparatus is shown in FIG. 6 by step 509.

The mode controller 207 may be based on the determined states of the apparatus select a mode of operation. For example where the state determiner 205 determines that the apparatus is located on a table then the mode controller prevents the apparatus from vibrating in such a way that the apparatus could move along the table and possibly fall off. In some embodiments the mode controller could even switch off the vibration mode when detecting the apparatus being on the table to prevent the apparatus resonating on the table and producing an unpleasant effect.

The selection of a mode or controlling the apparatus dependent on the state of determination is shown in FIG. 6 by step 511.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus in summary there may in at least one embodiment be an apparatus comprising: an actuator sensor configured to generate a motion of the apparatus in at least one actuation direction and to monitor apparatus motion in at least one monitoring direction; and a signal processor configured to determine dependent on the motion sensor output an characteristic of an object in contact with the apparatus. The actuator sensor in some embodiments as discussed above may be configured to generate a motion in three substantially mutually orthogonal directions. The actuator sensor may comprise an actuator configured to generate the motion in at least one actuation direction and a motion sensor configured to monitor the motion in the apparatus in at least one monitoring direction.

The actuation signal may comprise at least one of: a sinusoidal signal for generating a substantially sinusoidal motion of a predetermined frequency; a pulse signal for generating a substantially pulsing motion; a burst signal; and a wideband signal for generating multi-resonant motion.

The signal processor may comprise: a comparator configured to determining the difference between the motion in the apparatus in at least one monitoring direction against an expected motion; and an object determiner configured to determine the characteristic of the object dependent on the difference between the motion and expected motion.

The characteristic of the object detected by the apparatus may be at least one of: a location of the object relative to the apparatus; an elasticity of the object; a flexibility of the object; a compressibility of the object; a damping of the object; an inertia of the object; a mass of the object; a density of the object; a resonance frequency distribution of the object; and a retaining force exerted by the object on the apparatus. Furthermore dependent on the characteristic the apparatus may further comprise a controller configured to control the apparatus, for example the event notification application.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Thus in at least one embodiments there may be a computer-readable medium encoded with instructions that, when executed by a computer perform: actuating within an apparatus a motion in at least one actuation direction; monitoring the motion in the apparatus in at least one monitoring direction; and determining from the monitoring an characteristic of an object in contact with the apparatus.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits, programmable logic circuits (such as field programmable gate arrays FPGA), and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
at least one actuator and at least one sensor, the at least one actuator being configured to generate a motion of the apparatus in at least one direction upon receiving an actuation signal, wherein the motion of the apparatus is detected in at least one monitoring direction using at least one of the at least one actuator and the at least one sensor; and
a signal processor connected to at least one of the at least one actuator and the at least one sensor, wherein the signal processor is configured to receive a detected motion signal and to determine a state of the apparatus in terms of whether an object is located in contact with the apparatus, and wherein the signal processor includes a comparator to determine a difference between the detected motion signal and the actuation signal, said difference determining a characteristic of an object in contact with the apparatus and the state of the apparatus, whereby the apparatus selects a mode of operation based on the determined state of the apparatus.

2. The apparatus as claimed in claim 1, wherein the at least one actuator is configured to generate the motion in three substantially mutually orthogonal directions.

3. The apparatus as claimed in claim 1, wherein the motion is generated in at least one direction and the at least one direction is different from the at least one monitoring direction wherein the motion is detected.

4. The apparatus as claimed in claim 1, wherein the at least one sensor is at least one of:
- at least two sensors located orthogonally from each other;
- a piezo-electric sensor;
- a piezo-resistive sensor;
- an electro-magnetic sensor;
- a micro-mechanical capacitive system;
- a micro-electrical mechanical system;
- an accelerometer; and
- an accelerometer measuring accelerations along two orthogonal axes.

5. The apparatus as claimed in claim 1, wherein the at least one actuator is at least one of:
- at least one actuator and at least one sensor located orthogonally from each other;
- at least two actuators located orthogonally from each other;
- an eccentric rotating mass motor;
- a vibration motor;
- an electro-magnetic actuator;
- a linear resonant actuator; and
- a piezo-electric actuator.

6. The apparatus as claimed in claim 1, wherein the actuation signal comprises at least one of:
- a sinusoidal signal for generating a substantially sinusoidal motion of a predetermined frequency;
- a pulse signal for generating a substantially pulsing motion;
- a burst signal; and
- a wideband signal for generating multi-resonant motion.

7. The apparatus as claimed in claim 1, wherein the apparatus is controlled based on the state of the apparatus by the characteristic of the object, said characteristic being at least one of:
- a location of the object relative to the apparatus;
- an elasticity of the object;
- a flexibility of the object;
- a compressibility of the object;
- a damping of the object;
- an inertia of the object;
- a mass of the object;
- a density of the object;
- a resonance frequency distribution of the object; and
- a retaining force exerted by the object on the apparatus.

8. The apparatus according to claim 1, wherein the motion is a vibration.

9. The apparatus according to claim 1, wherein the apparatus is substantially prevented from vibrating when the apparatus is positioned against a surface of the object.

10. A method comprising:
- actuating within an apparatus a motion of the apparatus in at least one actuation direction with an actuation signal;
- monitoring the motion of the apparatus in at least one monitoring direction by detecting a motion signal;
- determining a difference between the motion of the apparatus in the at least one monitoring direction and an expected motion by comparing the actuation signal with the detected motion signal; and
- determining from the difference whether an object is located in contact with the apparatus.

11. The method as claimed in claim 10 wherein actuating the motion in at least one actuation direction within the apparatus comprises actuating the motion in three substantially mutually orthogonal directions.

12. The method as claimed in claim 11, wherein the at least one actuation direction is different to at least one monitoring direction.

13. The method as claimed in claim 10, wherein actuating the motion within the apparatus in at least one actuation direction further comprises:
- generating the actuation signal;
- generating the motion of the apparatus in the at least one actuation direction dependent on the actuation signal; and
- determining a state of the apparatus by a characteristic of the object dependent on the difference between the motion and the expected motion, wherein the characteristic of the object is at least one of:
- a location of the object relative to the apparatus;
- an elasticity of the object;
- a flexibility of the object;
- a compressibility of the object;
- a damping of the object;
- an inertia of the object;
- a mass of the object;
- a density of the object;
- a resonance frequency distribution of the object; and
- a retaining force exerted by the object on the apparatus.

14. The method as claimed in claim 13, further comprising controlling the apparatus dependent on the state of the apparatus, wherein controlling the apparatus comprises controlling an event notification application.

15. An apparatus comprising:
- at least one actuator configured to generate a vibration in the apparatus with an actuation signal, wherein the vibration in the apparatus is detected using at least one of the at least one actuator and an at least one sensor; and
- a processor configured to receive an indication of the detected vibration by using at least one of the at least one actuator and the at least one sensor to receive a detected motion signal, wherein the processor determines a state of the apparatus dependent on a difference between the generated vibration and the detected vibration by comparing the actuation signal and the detected motion signal, wherein the state of the apparatus is determined dependent on an object located in contact with the apparatus.

16. The apparatus as claimed in claim 15, wherein the vibration is generated when the at least one actuator is driven by an actuation signal.

17. The apparatus as claimed in claim 15, wherein the determined state of the apparatus controls a mode of operation.

* * * * *